United States Patent Office 2,741,620
Patented Apr. 10, 1956

2,741,620

HYDROXYMETHYL-ISONICOTINAMIDE AND ALKYL ETHERS THEREOF

Henry Martin, Zurich, and Ernst Habicht and Hans Zutter, Schaffhausen, Switzerland, assignors to Cilag Limited, Schaffhausen, Switzerland, a Swiss company No Drawing. Application October 20, 1953, Serial No. 387,312

Claims priority, application Switzerland November 14, 1952

6 Claims. (Cl. 260—295)

It has been found that the hydroxymethyl amide of the isonicotinic acid and its alkyl ethers of the formula

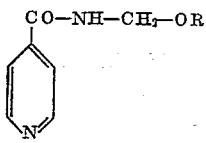

in which R represents a hydrogen or a lower alkyl radical show chemotherapeutically valuable properties.

The referred to free hydroxymethyl amide, if administered, for instance, to an animal infected with absolute deadly doses of hemolytic streptococcus effects a 100% rate of survival and complete cure. It has the same curative effect on animals infected with pneumo- and staphylococcus and coli bacteria. The above mentioned compound has also an excellent curative effect on animals infected with *Mycobacterium tuberculosis*.

It is known that nicotinic acid hydroxymethyl amide has the property of curing infections of the bile duct. Applied in the case of other illnesses, for instance, pneumonias and tuberculosis, this compound has little or no effect.

Further, it is known that pyrazine carboxyl acid amide (I) has a chemotherapeutical effect on infections with *mycobacterium tuberculosis*, which effect is several times that of p-amino salicylic acid whilst the hydroxymethyl compound of I is lacking any such property. (S. Kushner and collaborators, Journ. of Americ. Chem. Soc. 74, pages 3617–3621 (1952)).

With regard to the experiences of S. Kushner it was very surprising to find that the hydroxymethyl amide of isonicotinic acid shows such a strong tuberculostatic effect. Nor was it to be foreseen that this compound was effective against germs which are not affected by nicotinic acid hydroxymethyl amide. The lower alkyl ethers of the isonicotinic acid hydroxymethyl amides are in the same way effective as the free compound but compared with the latter have the advantage of greater water solubility and stability of their aqueous solutions.

The isonicotinic acid hydroxymethyl amide in question is obtained by a process known per se, i. e. by reacting isonicotinic acid amide with formaldehyde. The reaction is preferably carried out in an aqueous solution in a neutral or slightly alkaline medium at increased temperature. The formaldehyde may be replaced by formaldehyde-yielding agents, for instance, by polyoxymethylene, trioxane, etc. but the use of such agents does not offer any advantage over the above mentioned process.

The alkyl ethers of isonicotinic acid hydroxymethyl amide are obtained by reacting the latter with the corresponding alcohols in the presence of etherifying catalysts. For instance, organic or inorganic acids such as formic acid, sulfuric acid, hydrochloric acid, phosphoric acid may be used as catalysts. Other known etherifying agents are also effective, for instance, zinc chloride, bortrifluoride, etc. With mineral acids as etherifying agents, it has been found that not catalytical but molar or quantities more than molar should be used. As solvents, we prefer to use the alcohol that is etherified in excess.

Hereinafter it is described in which manner the desired compounds may be obtained in a pure and good yield:

Example 1

17 gm. of isonicotinic acid amide are suspended in a neutralised 35% formaldehyde solution. The suspension is heated on the water bath for several hours or boiled under reflux for one hour. From the solution, clear in the heat, separate in the cold colorless, well formed crystals which, if necessary, may be recrystallised from isopropanol, acetone or, after drying, from acetic acid. In this way N-hydroxymethyl isonicotinic acid amide is obtained in fine crystalline needles with the melting point 140–142° C. The yield is 14 gm. and corresponds to a yield of 66% of the theoretical. As to its solubility, this compound hardly differs from the basic isonicotinic acid amide. It is quite easily soluble in water and alcohol, less soluble in higher alcohols, acetone, dioxane, etc. and hardly soluble in ether, acetic acid ethyl ester, benzene.

On heating above the melting point, the quickest reaction being ensured at about 200° C., the N-hydroxymethyl compound is converted into the corresponding methylene compound N,N' - bis(isonicotinyl) - diamino - methane, whereby formaldehyde splits off. The latter compound, upon cooling, separates from the boiling 50% acetic acid solution in form of well formed colorless crystals with the melting point 310–311° C.

Example 2

30.4 gm. isonicotinic acid hydroxymethyl amide in 150 ccm. of methanol are boiled under reflux with 23 ccm. of concentrated hydrochloric acid for half an hour. After cooling, the obtained clear solution is neutralised with 50 gm. calcinated sodium carbonate, the salt cake is sucked off, and the filtrate is evaporated at 60–70° C. in vacuo. The residue is stirred with 300 ccm. ether, the etheric solution is dried with potassium carbonate, heated, and filtered. The salt cake is three times boiled with 200 ccm. ether each time, the etheric solutions are united, once again dried with potassium carbonate, and evaporated. The remaining oil solidifies after a short time to colorless crystals. These are taken up in 150 ccm. benzene, the solution is mixed with petroleum ether to cloudiness, and cooled. The isonicotinic acid methoxymethyl amide is obtained in form of colorless, well formed crystals, melting at 67–68° C. The yield is 14.3 gm., i. e. 43% of the theoretical. The new ether is easily soluble in water, ethanol, acetone, little soluble in petroleum ether.

Example 3

In the same way as described in Example 2, isonicotinic acid ethoxymethyl amide is obtained from 0.2 mol of isonicotinic acid hydroxymethyl amide, 3.8 mol ethanol, and 0.22 mol concentrated hydrochloric acid. This amide boils under 0.015 mm. at 167° C. and forms a colorless oil easily soluble in water, ethanol and acetone, little soluble in ether and petroleum ether.

Example 4

Similarly as described in Example 2, isonicotinic acid-n-propoxymethyl amide is obtained, melting at 66–68° C. solubilities as with the methoxy and ethoxy compound.

Example 5

The isopropoxy compound is similarly obtained. It boils under 0.0 mm. at 168° C. Solubilities as described above.

Example 6

Analogous to Example 2, the n-butoxy compound is obtained, which is a slightly yellow colored oil. It is quite readily soluble in water, easily soluble in alcohol, acetone, little soluble in ether and petroleum ether.

What we claim is:

1. New chemical compounds of the formula

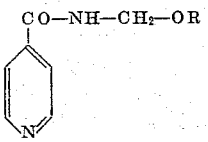

wherein R signifies a substituent selected from the class consisting of a hydrogen atom and a lower alkyl radical.

2. The new chemical compound of the formula

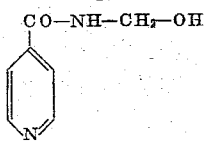

3. The new chemical compound of the formula

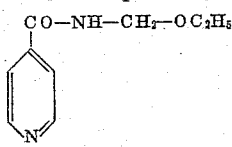

4. The new chemical compound of the formula

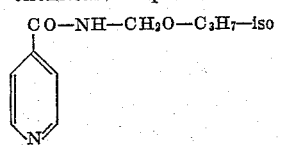

5. The new chemical compound of the formula

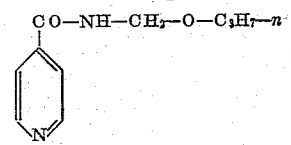

6. The new chemical compound of the formula

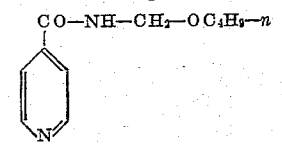

References Cited in the file of this patent

FOREIGN PATENTS 203,947    Switzerland _____ July 1, 1939

OTHER REFERENCES

Graf: Jour. für Praktische Chemie, 138: 294 and 295 (1938).